US011319399B2

(12) United States Patent
Sacher et al.

(10) Patent No.: US 11,319,399 B2
(45) Date of Patent: May 3, 2022

(54) DEVICE AND METHOD FOR PREPARING A LIQUID POLYMER BLEND

(71) Applicant: WEBASTO SE, Stockdorf (DE)

(72) Inventors: Martin Sacher, Stockdorf (DE); Markus Rauch, Stockdorf (DE); Jan Woköck, Stockdorf (DE); Alexander Isbach, Stockdorf (DE); Karl-Heinz Bartl, Stockdorf (DE); Martin Seebass, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 364 days.

(21) Appl. No.: 15/775,180

(22) PCT Filed: Oct. 26, 2016

(86) PCT No.: PCT/EP2016/075853
§ 371 (c)(1),
(2) Date: May 10, 2018

(87) PCT Pub. No.: WO2017/089064
PCT Pub. Date: Jun. 1, 2017

(65) Prior Publication Data
US 2018/0319923 A1 Nov. 8, 2018

(30) Foreign Application Priority Data

Nov. 26, 2015 (DE) .......................... 102015120526.2

(51) Int. Cl.
| B29B 7/84 | (2006.01) |
| C08G 18/32 | (2006.01) |
| B29B 7/74 | (2006.01) |
| B29B 7/88 | (2006.01) |
| B29B 7/86 | (2006.01) |
| C08G 18/40 | (2006.01) |

(Continued)

(52) U.S. Cl.
CPC ..... *C08G 18/3203* (2013.01); *B01D 19/0036* (2013.01); *B29B 7/72* (2013.01);
(Continued)

(58) Field of Classification Search
CPC ....... C08J 2203/06; C08J 9/18; Y10S 264/83; Y10S 521/917; B29B 7/7409; B29B 7/7414; B29B 7/7419; B29B 7/7423
See application file for complete search history.

(56) References Cited

U.S. PATENT DOCUMENTS 3,396,126 A * 8/1968 Gurley, Jr. .............. C08L 75/04
521/120
3,437,276 A * 4/1969 Reichard ................. C08L 75/04
241/38

(Continued)

FOREIGN PATENT DOCUMENTS

DE 3147160 A1 6/1983
DE 3602024 A1 7/1987

(Continued)

OTHER PUBLICATIONS

International Preliminary Report on Patentability issued against International Application No. PCT/EP2016/075853 dated May 29, 2018.

(Continued)

*Primary Examiner* — Jonathan Luke Pilcher
(74) *Attorney, Agent, or Firm* — Fitch, Even, Tabin & Flannery, LLP

(57) ABSTRACT

A device for preparing a liquid polymer blend is proposed having a storage container for the liquid polymer blend; a degassing device, which is arranged downstream of the storage container, for the liquid polymer; a gassing device, which is arranged downstream of the degassing device, for adding an additive gas to the liquid polymer blend; a homogenization unit, which is arranged downstream of the gassing device, for the polymer blend to which the additive gas was added; and an output line, which is connected to the homogenization unit, for the homogenized polymer blend.

7 Claims, 1 Drawing Sheet

(51) Int. Cl.
  *C08J 9/12* (2006.01)
  *B29B 7/72* (2006.01)
  *B01D 19/00* (2006.01)
  *B29C 67/24* (2006.01)
  *B29C 44/12* (2006.01)
  *B29L 31/30* (2006.01)
  *B29K 75/00* (2006.01)

(52) U.S. Cl.
  CPC .......... *B29B 7/7414* (2013.01); *B29B 7/7433* (2013.01); *B29B 7/847* (2013.01); *B29B 7/86* (2013.01); *B29B 7/88* (2013.01); *C08G 18/40* (2013.01); *C08J 9/122* (2013.01); *B29C 44/1271* (2013.01); *B29C 67/246* (2013.01); *B29K 2075/00* (2013.01); *B29L 2031/3002* (2013.01); *C08G 2110/0008* (2021.01); *C08G 2110/0025* (2021.01); *C08J 2203/06* (2013.01); *C08J 2375/04* (2013.01)

(56) References Cited

U.S. PATENT DOCUMENTS

| | | | |
|---|---|---|---|
| 3,807,703 A * | 4/1974 | Day | B01J 19/006 366/290 |
| 4,157,427 A | 6/1979 | Ferber | |
| 4,376,172 A | 3/1983 | Belangee et al. | |
| 4,764,536 A | 8/1988 | Proksa et al. | |
| 4,973,608 A | 11/1990 | Krippl et al. | |
| 5,296,517 A | 3/1994 | Wetzig et al. | |
| 5,403,088 A | 4/1995 | Killmer et al. | |
| 5,521,224 A * | 5/1996 | Sulzbach | B29B 7/7414 521/155 |
| 2003/0149168 A1 | 8/2003 | Bernard et al. | |
| 2004/0207101 A1 | 10/2004 | Ehrlicher | |

FOREIGN PATENT DOCUMENTS

| | | |
|---|---|---|
| DE | 10157726 A1 | 6/2003 |
| DE | 69815358 T2 | 4/2004 |
| DE | 102010000856 A1 | 7/2011 |
| EP | 0332032 A1 | 9/1989 |
| EP | 0565974 B1 | 10/1993 |

OTHER PUBLICATIONS

International Search Report for PCT/EP2016/075853 dated Jan. 31, 2017 and English translation submitted herewith (7 Pages).

* cited by examiner

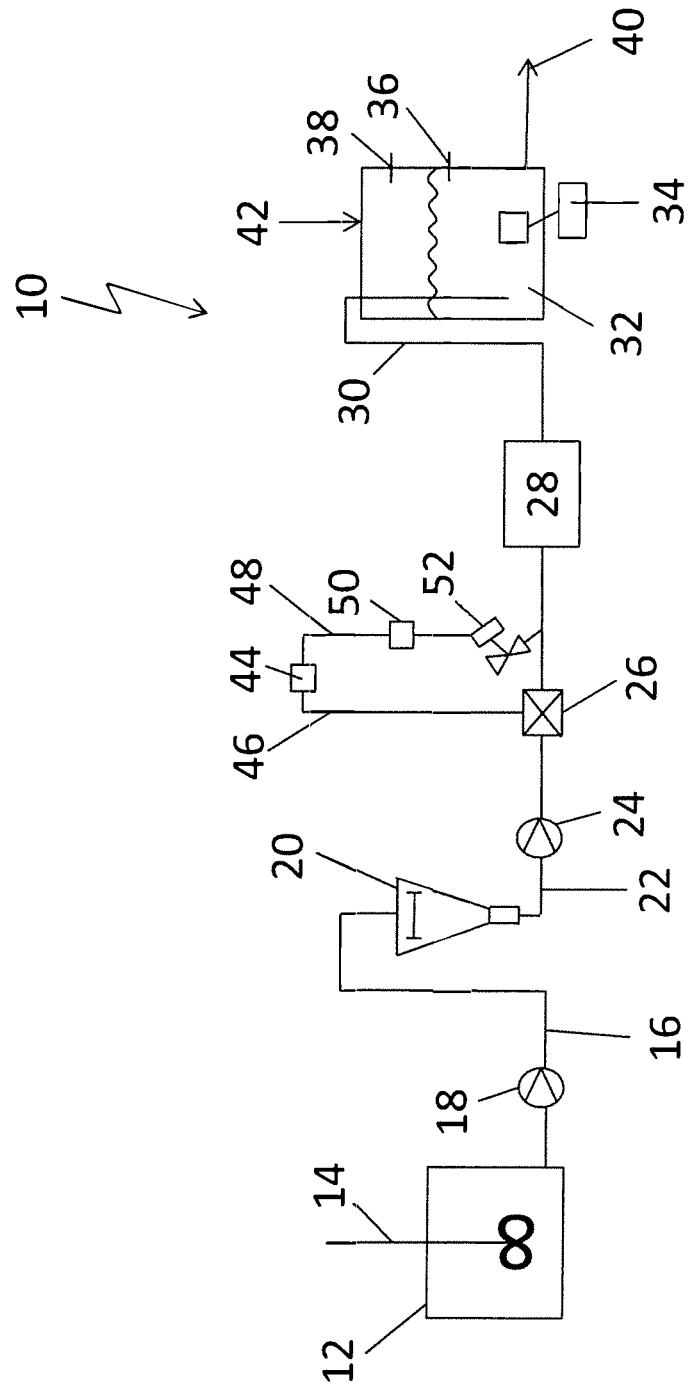

DEVICE AND METHOD FOR PREPARING A LIQUID POLYMER BLEND

CROSS-REFERENCE TO RELATED APPLICATIONS

This application is a U.S. national phase application filed under 35 U.S.C. § 371 of International Application No. PCT/EP2016/075853, filed Oct. 26, 2016, designating the United States, which claims priority from German Patent Application 102015120526.2, filed Nov. 26, 2015, which are hereby incorporated herein by reference in their entirety for all purposes.

FIELD

The invention relates to a device and a method for preparing a liquid polymer blend, in particular for the immediate use in polyurethane systems.

BACKGROUND

From practice it is known to nucleate liquid polymer blends, such as polyol compounds for polyurethane systems, i.e. to charge them with a gas, before further processing. The bulk density is thus reduced so that the polyurethane system can be realized as a foam, in particular a hard foam or soft foam, in its fully cured and hardened state. The gas charge or rather nucleation so far has been carried out in process containers, into which the respective gas is fed and in which the polyol compound is homogenized by a stirrer. Here, a gas charge, which was added to the polyol compound by stirring and transporting, remains unconsidered so that the polyol compound contains an undefined amount of gas. This in turn leads to the polyol compound being only insufficiently homogenized and the end product, i.e. the polyurethane system in its fully hardened state, comprising gas inclusions due to an insufficient dispersion of the gas charge, which can significantly alter the appearance of the end product and lead to post-processing measures or to product rejection.

The task of the invention is therefore to create a device and a method for preparing a liquid polymer blend which has a high level of homogenization after preparation and which is suitable in particular for immediate use in polyurethane systems.

The device and the method according to the invention therefore enable providing a liquid polymer blend having a defined nucleation or gas charge for further processing and in particular for immediate use when producing a polyurethane system. Gas charges of the polymer blend, whose causes and whose amounts are unknown, can be removed by degassing the liquid polymer blend. The subsequent gassing with the additive gas can be carried out in a defined manner so that the resulting amount of gas in the polymer blend is known. An even or rather homogenous distribution of gas bubbles formed by the additive gas in the polymer blend can be ensured by the subsequent homogenization of the polymer blend charged with the additive gas.

SUMMARY

In a preferred embodiment of the device according to the invention, by means of which a high-quality homogenization of the polymer blend can be attained, the homogenization unit homogenizes the polymer blend according to a friction process. For this purpose, a so-called colloid mill, in particular a toothed colloid mill, can be used, in which a mill gap, through which the polymer blend is supplied, is formed between a rotor having a tapered surface and a corresponding stator having a tapered surface. The mill gap preferably has a width narrower than 0.1 mm. In the homogenization unit, a liquid polymer blend is produced in which gas bubbles from the additive gas are finely dispersed. The homogenization unit therefore also forms a dispersion unit.

The degassing device of the device according to the invention preferably comprises a vacuum ventilator. A vacuum ventilator functions such that the polymer blend having air and gas inclusions is supplied in a pressurized funnel-shaped container via a valve. In the container, the polymer blend flows on a whirling plate which is rotationally driven and has an annular sieving screen on its periphery. The polymer blend is centrifuged against an inner wall of the container due to centrifugal forces. At the inner wall, a thinner polymer blend film is derived, in which present gas bubbles pop. Gases released in this manner are in turn suctioned by a vacuum pump. The bubble-free or rather gas-free polymer blend flows downward along the inner wall of the funnel-shaped container and can be supplied further towards the gassing device and the homogenization unit.

In order to be able to exactly define the amount of gas, which is added to the degassed polymer blend, the gassing device comprises a gas mass flow meter and a dosing valve, which is arranged at a pipe which connects the degassing device and the homogenization unit, in a preferred embodiment of the device according to the invention.

In order to also exactly apprehend the amount of the polymer blend, which is charged with the additive gas, a special embodiment of the device according to the invention comprises a mass flow meter for the polymer blend downstream of the degassing device and upstream of the gassing device.

In a manner purposeful to the invention, the mass flow meter for the polymer blend and the gassing device are connected to an electronic control device. The control device can comprise an input unit, by means of which the degree of gassing of the liquid polymer blend is preset. An exactly defined amount of gas is added to the liquid polymer blend, which is subsequently supplied to the homogenization unit, by means of the gassing device, which can comprise the gas mass flow meter and the dosing valve in the form of a needle valve, as a function of the measurement of the mass flow meter for the polymer blend.

In the method according to the invention, the polymer blend is preferably stirred in a storage container before being degassed so that any layering of the liquid polymer blend caused by storage can be canceled out.

The polymer blend, which is prepared using the device according to the invention or rather according to the method of the invention, is a polyol compound, for example, which is used for producing a polyurethane system to which an isocyanate is added in a mixing and dosing head for further processing. The polyurethane system serves, for example, for producing hard-foam edges of a flat vehicle body element or of a sliding roof lid of a roof opening system of a motor vehicle.

The additive gas, which is added to the polymer blend for preparation, is carbon dioxide, for example. It is also conceivable, however, to use other gases, in particular inert gases.

In the method according to the invention, liquids can also be added to the polymer blend, in particular additives which influence the reactivity. Alcohols, acids, inhibitors, flame retardants, catalysts, cross-linking agents, propellants and/or solvents, which are all used for producing polyurethane, for example, can be used. This preferably occurs before supplying the liquid polymer blend to the homogenization unit in a defined manner, the resulting formulation of the polymer blend being known owing to the use of dosing systems and mass flow meters.

Further advantages and advantageous embodiments of the subject matter of the invention can be derived from the description, the drawing and the claims.

BRIEF DESCRIPTIONS OF THE DRAWING

An exemplary embodiment of a device according to the invention is illustrated in the drawing in a schematically simplified manner and is further described in the following description.

DETAILED DESCRIPTION

The only FIGURE of the drawing illustrates a device according to the invention for carrying out a method for preparing a liquid polyol compound.

In the drawing, a device 10 for preparing a polyol compound is illustrated, which represents a reaction polymer for a polyurethane system which serves for producing a plastic foam edge of a sliding roof lid of a roof opening system for a motor vehicle.

The device 10 comprises a storage container 12, in which the polyol compound can be stored and which is provided with a stirrer 14 in order to cancel out any layering of the polyol compound caused by storage. The storage container 12 is connected to a degassing device 20, which is formed by a vacuum ventilator, via a pipe 16, in which a supply pump 18 is arranged. An output pipe 22, in which another supply pump 24 and a mass flow meter 26 are arranged and which leads to a homogenization unit 28 formed by a toothed colloid mill, is connected to the vacuum ventilator. A dosing valve 52, via which an additive gas can be added to the polyol compound and which is part of a gassing device, is arranged at the pipe 16 upstream of the homogenization unit 28.

The homogenization unit 28 comprises an output pipe 30, which leads into a container 32 in which the prepared polymer blend is stored temporarily and which is provided with a stirrer unit 34. A positive pressure between 1 and 6 bars is realized in the container 32. The output pipe 30 leads such into the container 32 that the prepared polymer blend is supplied to the polymer blend already in the container 32 below the level of the latter polymer blend. The level or rather the filling level of the polymer blend in the container 32 is always kept between two marks, of which a lower one is provided with a first sensor 36 and an upper one is provided with a second sensor 38. The sensor 36 allocated to the lower mark gives a signal when the nominal filling level in the container 32 is fallen below and further liquid has to be prepared. The second sensor 38 allocated to the upper mark gives a signal when the nominal filling level is exceeded and the preparation of the liquid polymer blend has to be stopped by means of the device 10.

The container 32 is connected to processing stations for the polyol compound via a flow pipe 40, said processing stations each being allocated to a foaming tool for producing a plastic frame of a sliding roof lid, and an isocyanate being added to the polyol compound in the processing stations in order to form a polyurethane system. Moreover, a return pipe 42, which forms a ring pipe in conjunction with the flow pipe 40 for supplying the processing stations, leads into the container 32.

In order to control the preparation of the polyol compound, the device 10 comprises a control device 44, which is connected to the mass flow meter 26 via a pipe 46 and is connected to a gas mass flow meter 50 also allocated to the gassing device and to the dosing valve 52 via a pipe 48; carbon dioxide can be added to the liquid polyol compound as an additive gas by means of the dosing valve 52, and this upstream of the homogenization unit 28 and downstream of the mass flow meter 26.

The method for preparing the polyol compound, which can be carried out by means of the device 10, can be realized in the subsequently described manner.

The polyol compound, which is stirred in the storage container 12, is supplied in the degassing device 20 by means of the supply pump 18 and is freed of undefined gas charges there. Subsequently, the degassed polymer blend consisting of the polyol compound is supplied through the output pipe 22 by means of the supply pump 24. For this purpose, the amount of the polyol compound is first detected by means of the mass flow meter 26 and carbon dioxide is subsequently added via the gas mass flow meter 50 and the dosing valve 52 by means of the control device 44 as a function of the measurement. Downstream of the dosing valve 52, the polyol compound, to which carbon dioxide has been added, is guided through the homogenization unit 28 in order to disperse gas bubbles, which are formed from the carbon dioxide, in the polyol compound. The thus prepared polyol compound is then guided into the container 32 via the output pipe 30 so that it can be further processed, in particular being able to be further processed by adding an isocyanate to a polyurethane system, which can be used for producing a hard-foam edge of a sliding roof lid or similar.

LIST OF REFERENCES

10 device
12 storage container
14 stirrer
16 pipe
18 delivery pump
20 degassing device
22 output pipe
24 supply pump
26 mass flow meter
28 homogenization unit
30 output pipe
32 container
34 stirring device
36 sensor
38 sensor
40 flow pipe
42 return pipe
44 control device
46 pipe
48 pipe
50 gas mass flow meter
52 dosing valve

The invention claimed is:
1. A method for preparing a liquid polymer blend, comprising the steps of:
  degassing the liquid polymer blend;
  subsequently aerating the degassed liquid polymer blend with an additive gas;

homogenizing the liquid polymer blend provided with the additive gas;

supplying the homogenized liquid polymer blend to a container having a stirring unit;

storing temporarily the homogenized liquid polymer blend in the container, stirring the homogenized liquid polymer blend while in the container;

providing the homogenized liquid polymer blend to a processing station via a pipe connected to the container, further comprising the steps of:

measuring a mass flow of the liquid polymer blend after the degassing step, determining an amount of the additive gas as a function of the measured mass flow of the liquid polymer blend, and adding the amount of determined additive gas to the degassed liquid polymer blend.

2. The method according to claim 1, wherein the homogenizing takes place in a colloid mill.

3. The method according to claim 1, wherein the degassing takes place in a vacuum ventilator.

4. The method according to claim 1, wherein the liquid polymer blend comprises a polyol suitable for use in the production of a polyurethane system.

5. The method according to claim 1, wherein the additive gas comprises carbon dioxide and/or air.

6. The method according to claim 1, further comprising the step of maintaining the fill level of the container between two predetermined levels.

7. The method according to claim 6, wherein the maintaining of the fill level is achieved by sensing the fill level at the two predetermined levels and signaling to start or stop the supplying.

* * * * *